US010060353B2

(12) United States Patent
Duesler et al.

(10) Patent No.: US 10,060,353 B2
(45) Date of Patent: Aug. 28, 2018

(54) HEAT EXCHANGER FOR COOLED COOLING AIR

(71) Applicant: United Technologies Corporation, Hartford, CT (US)

(72) Inventors: Paul W. Duesler, Manchester, CT (US); Frederick M. Schwarz, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 355 days.

(21) Appl. No.: 14/826,871

(22) Filed: Aug. 14, 2015

(65) Prior Publication Data

US 2017/0044982 A1    Feb. 16, 2017

(51) Int. Cl.
   *F02C 7/18* (2006.01)
   *F02C 7/141* (2006.01)
   *F02C 7/32* (2006.01)
   *F28F 9/00* (2006.01)
   *F01D 25/12* (2006.01)

(52) U.S. Cl.
   CPC .............. *F02C 7/185* (2013.01); *F01D 25/12* (2013.01); *F02C 7/141* (2013.01); *F02C 7/32* (2013.01); *F28F 9/002* (2013.01); *F05D 2220/32* (2013.01); *F05D 2240/91* (2013.01); *F05D 2250/42* (2013.01); *F05D 2260/213* (2013.01); *F05D 2260/232* (2013.01); *F05D 2260/30* (2013.01); *F05D 2260/941* (2013.01); *F28F 2265/26* (2013.01); *Y02T 50/675* (2013.01)

(58) Field of Classification Search
   None
   See application file for complete search history.

(56) References Cited

U.S. PATENT DOCUMENTS

| 4,676,305 | A  | * | 6/1987  | Doty .................... F28D 7/1653 165/158 |
| 9,835,380 | B2 | * | 12/2017 | Kupiszewski ........ F28D 1/0233 |
| 2011/0146944 | A1 |   | 6/2011  | Hand et al. |
| 2013/0236299 | A1 | * | 9/2013  | Kington .................... F02C 7/10 415/177 |

FOREIGN PATENT DOCUMENTS

| DE | 102008027842 | 2/2009 |
| EP | 2811249 | 12/2014 |
| WO | 2013027623 | 2/2013 |

OTHER PUBLICATIONS

Extended European Search Report dated Jan. 11, 2017 in European Application No. 16182679.7.

* cited by examiner

*Primary Examiner* — Ninh H Nguyen
*Assistant Examiner* — Jason Davis
(74) *Attorney, Agent, or Firm* — Snell & Wilmer L.L.P.

(57) ABSTRACT

A heat exchanger (HEX) for cooling air in a gas turbine engine is provided. The HEX may comprise an intake manifold in fluid communication with a compressor section and configured to receive air from the compressor section, an outtake manifold in fluid communication with the intake manifold via a tube, and a cooling air flow path defined by at least one of an outer surface of the tube, an outer surface of the intake manifold, and an outer surface of the outtake manifold, wherein the cooling air flow path is orthogonal to said tube. The air from the intake manifold may travel through the tube to the outtake manifold and from the outtake manifold to a portion of the gas turbine engine.

17 Claims, 7 Drawing Sheets

HEAT EXCHANGER FOR COOLED COOLING AIR

FIELD

The present disclosure relates to gas turbine engines, and, more specifically, to heat exchangers (HEX) for cooling air of gas turbine engines.

BACKGROUND

As higher pressures are achieved in compressors of gas turbine engines, the temperature of compressed air in and/or leaving the compressors may increase as well. As a result, various components in a gas turbine engine may experience thermal stress. Thus, a heat exchanger (HEX) may be provided to cool hot air in a gas turbine engine.

SUMMARY

A heat exchanger for cooling air in a gas turbine engine may comprise an intake manifold in fluid communication with a compressor section and configured to receive air from the compressor section, an outtake manifold in fluid communication with the intake manifold via a tube, and a cooling air flow path defined by at least one of an outer surface of the tube, an outer surface of the intake manifold, and an outer surface of the outtake manifold, wherein the cooling air flow path is orthogonal to said tube. The air from the intake manifold may travel through the tube to the outtake manifold and from the outtake manifold to a portion of the gas turbine engine.

In various embodiments, the heat exchanger may further comprise a shroud at least partially encasing said tube. In various embodiments, a flow area of the tube may be less than 5% of the flow area of the intake manifold. In various embodiments, the cooling air flow path may receive air from at least one of a bypass flow path and a low pressure compressor of the gas turbine engine. In various embodiments, the tube may be coupled to a second half of the intake manifold and coupled to a second half of the outtake manifold. In various embodiments, the intake manifold may include a first attachment feature configured to be immovably fixed to a gas turbine engine and a second attachment feature configured to be coupled to a gas turbine engine, wherein the second attachment feature may freely translate away from and translate towards the first attachment feature with the heat exchanger. In various embodiments, the outtake manifold may include a third attachment feature configured to be coupled to a gas turbine engine and a fourth attachment feature configured to be coupled to a gas turbine engine, wherein the third attachment feature and the fourth attachment feature are configured to be able to freely translate away from and translate towards the first attachment feature with the heat exchanger. In various embodiments, at least one of the intake manifold and the outtake manifold may define a cylindrical void. In various embodiments, the intake manifold may be configured to receive air from a high pressure compressor section of the gas turbine engine.

A gas turbine engine may comprise a compressor section and an air-to-air heat exchanger. The air-to-air heat exchanger may comprise an intake manifold in fluid communication with a compressor section and configured to receive air from the compressor section, an outtake manifold in fluid communication with the intake manifold via a tube, and a cooling air flow path defined by at least one of an outer surface of the tube, an outer surface of the intake manifold, and an outer surface of the outtake manifold, wherein the cooling air flow path is orthogonal to said tube. The air from the intake manifold may travel through the tube to the outtake manifold and from the outtake manifold to a portion of the gas turbine engine.

In various embodiments, the heat exchanger may further comprise a shroud at least partially encasing said tube. In various embodiments, a flow area of the tube may be less than 5% of the flow area of the intake manifold. In various embodiments, the cooling air flow path may receive air from a bypass flow path of the gas turbine engine. In various embodiments, the tube may be coupled to a second half of the intake manifold and coupled to a second half of the outtake manifold. In various embodiments, the intake manifold may include a first attachment feature configured to be immovably fixed to a gas turbine engine and a second attachment feature configured to be coupled to a gas turbine engine, wherein the second attachment feature may freely translate away from and translate towards the first attachment feature with the heat exchanger. In various embodiments, the outtake manifold may include a third attachment feature configured to be coupled to a gas turbine engine and a fourth attachment feature configured to be coupled to a gas turbine engine, wherein the third attachment feature and the fourth attachment feature are configured to be able to freely translate away from and translate towards the first attachment feature with the heat exchanger. In various embodiments, at least one of the intake manifold and the outtake manifold may define a cylindrical void. In various embodiments, the intake manifold may be configured to receive air from the compressor section of the gas turbine engine.

A heat exchanger for a gas turbine engine may comprise a first attachment feature configured to be immovably fixed to a gas turbine engine and a second attachment feature configured to be coupled to a gas turbine engine, wherein the second attachment feature is configured to at least one of translate away from and translate towards the first attachment feature. The heat exchanger may comprise an intake manifold in fluid communication with a compressor section and configured to receive air from the compressor section, an outtake manifold in fluid communication with the intake manifold via a tube, and a cooling air flow path defined by at least one of an outer surface of the tube, an outer surface of the intake manifold, and an outer surface of the outtake manifold, wherein the cooling air flow path is orthogonal to said tube. The air from the intake manifold may travel through the tube to the outtake manifold.

In various embodiments, the translating may be in response to at least one of expansion and contraction of the heat exchanger, wherein the at least one of expansion and contraction is in response to at least one of an increase and decrease in temperature.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by refer

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion. As used herein, "gas" and "air" may be used interchangeably.

Fuel efficiency of gas turbine engines is known to be proportional to the ratio of the exit pressure and the inlet pressure of the engine, or overall pressure ratio (OPR). As the OPR increases, the efficiency of the engine generally increases. However, a byproduct of OPR is high operating temperatures in various portions of the engine, such as the high pressure compressor for example. Materials used in gas turbine engines have temperature thresholds which should not be surpassed for successful operation. Cooling air may be used to decrease operating temperatures of various components in a gas turbine engine. Generally, air from a compressor section of a gas turbine engine is used to cool other sections of the engine. However, as the OPR of gas turbine engines increases, the air from the compressor section may become increasingly hot. A heat exchanger (HEX) may be used to cool the air from a compressor section, thus providing cooled cooling air.

Figure 1:
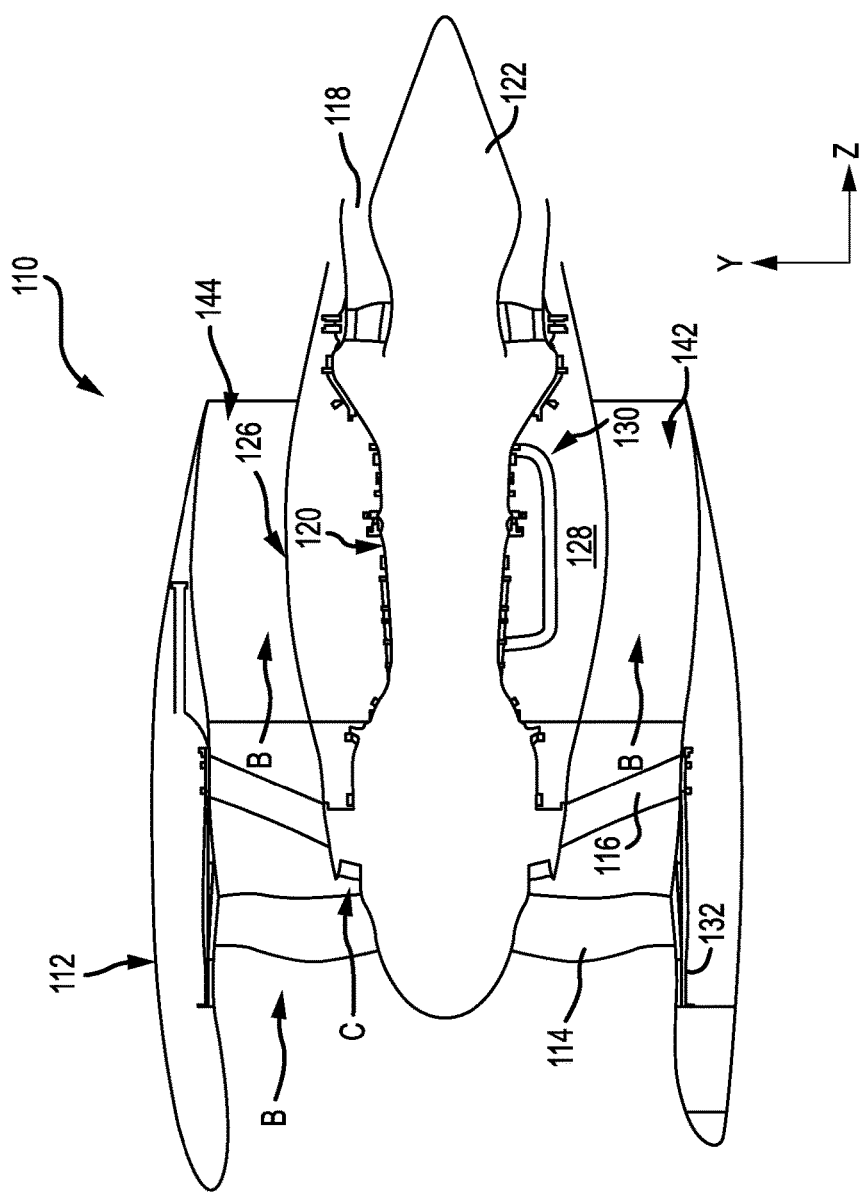
- FIG. 1 illustrates a cross-sectional view of an exemplary gas turbine engine, in accordance with various embodiments.

FIG. 1 illustrates a schematic view of a gas turbine engine, in accordance with various embodiments. Gas turbine engine 110 may include core engine 120. Core air flow C flows through core engine 120 and is expelled through exhaust outlet 118 surrounding tail cone 122.

Core engine 120 drives a fan 114 arranged in a bypass flow path B. Air in bypass flow-path B flows in the aft direction (z-direction) along bypass flow-path B. At least a portion of bypass flow path B may be defined by nacelle 112 and inner fixed structure (IFS) 126. Fan case 132 may surround fan 114. Fan case 132 may be housed within fan nacelle 112.

Figure 2:
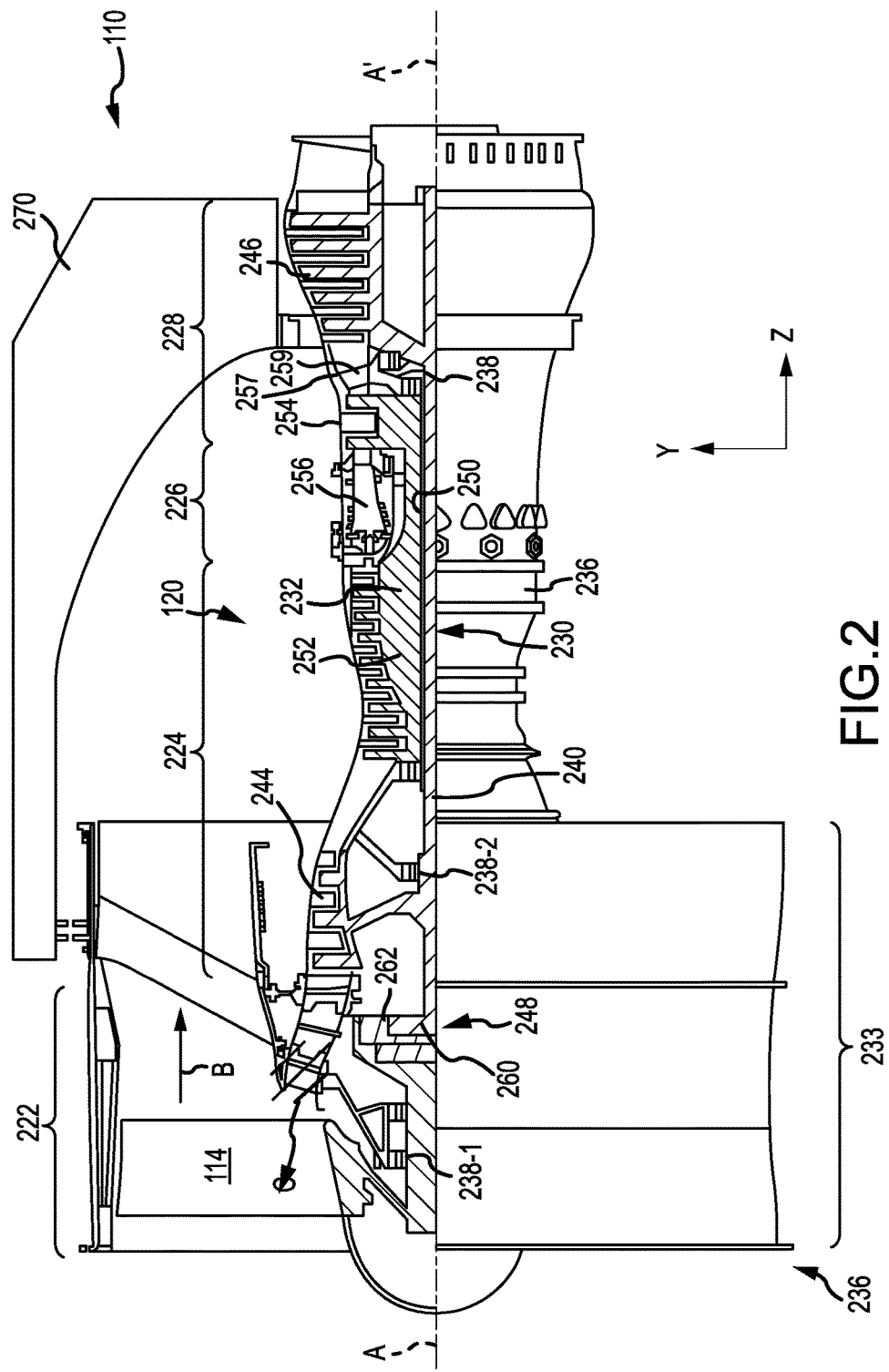
FIG. 2 illustrates a cross-sectional view of an exemplary gas turbine engine mounted to a pylon, in accordance with various embodiments.

With momentary reference to FIG. 2, nacelle 112 typically comprises two halves which are typically mounted to pylon 270. Fan case structure 233 may provide structure for securing gas turbine engine 110 to pylon 270. According to various embodiments, multiple guide vanes 116 may extend radially between core engine 120 and IMC 134.

Upper bifurcation 144 and lower bifurcation 142 may extend radially between the nacelle 112 and IFS 126 in locations opposite one another to accommodate engine components such as wires and fluids, for example.

Inner fixed structure 126 surrounds core engine 120 and provides core compartments 128. Various components may be provided in core compartment 128 such as fluid conduits and/or a compressed air duct 130, for example. Compressed air duct 130 may be under high pressure and may supply compressed cooling air from a compressor stage to a high pressure turbine stage, for example. In various embodiments, a heat exchanger may be coupled to compressed air duct 130.

With respect to FIG. 2, elements with like element numbering as depicted in FIG. 1 are intended to be the same and will not necessarily be repeated for the sake of clarity.

In various embodiments and with reference to FIG. 2, a gas turbine engine 110 is provided. Gas turbine engine 110 may be a two-spool turbofan that generally incorporates a fan section 222, a compressor section 224, a combustor section 226 and a turbine section 228. Alternative engines may include, for example, an augmentor section among other systems or features. In operation, fan section 222 can drive air along a bypass flow-path B while compressor section 224 can drive air along a core flow-path C for compression and communication into combustor section 226 then expansion through turbine section 228. Although depicted as a turbofan gas turbine engine 110 herein, it should be understood that the concepts described herein are not limited to use with turbofans as the teachings may be applied to other types of turbine engines including three-spool architectures.

Gas turbine engine 110 may generally comprise a low speed spool 230 and a high speed spool 232 mounted for rotation about an engine central longitudinal axis A-A' relative to an engine static structure 236 via one or more bearing systems 238 (shown as bearing system 238-1 and bearing system 238-2 in FIG. 2). It should be understood that various bearing systems 238 at various locations may alternatively or additionally be provided including, for example, bearing system 238, bearing system 238-1, and bearing system 238-2.

Low speed spool 230 may generally comprise an inner shaft 240 that interconnects a fan 114, a low pressure (or first) compressor section 244 and a low pressure (or first) turbine section 246. Inner shaft 240 may be connected to fan 114 through a geared architecture 248 that can drive fan 114 at a lower speed than low speed spool 230. Geared architecture 248 may comprise a gear assembly 260 enclosed within a gear housing 262. Gear assembly 260 couples inner shaft 240 to a rotating fan structure. High speed spool 232 may comprise an outer shaft 250 that interconnects a high-pressure compressor ("HPC") 252 (e.g., a second compressor section) and high pressure (or second) turbine section 254. A combustor 256 may be located between HPC 252 and high pressure turbine 254. A mid-turbine frame 257 of engine static structure 236 may be located generally between high pressure turbine 254 and low pressure turbine 246. Mid-turbine frame 257 may support one or more bearing systems 238 in turbine section 228. Inner shaft 240 and outer shaft 250 may be concentric and rotate via bearing systems 238 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 244 then HPC 252, mixed and burned with fuel in combustor 256, then expanded over high pressure turbine 254 and low pressure turbine 246. Mid-turbine frame 257 includes airfoils 259 which are in the core airflow path. Low pressure turbine 246 and high pressure turbine 254 rotationally drive the respective low speed spool 230 and high speed spool 232 in response to the expansion.

Gas turbine engine 110 may be, for example, a high-bypass geared aircraft engine. In various embodiments, the bypass ratio of gas turbine engine 110 may be greater than about six (6). In various embodiments, the bypass ratio of gas turbine engine 110 may be greater than ten (10). In various embodiments, geared architecture 248 may be an epicyclic gear train, such as a star gear system (sun gear in meshing engagement with a plurality of star gears supported by a carrier and in meshing engagement with a ring gear) or other gear system. Geared architecture 248 may have a gear reduction ratio of greater than about 2.3 and low pressure turbine 246 may have a pressure ratio that is greater than about 5. In various embodiments, the bypass ratio of gas turbine engine 110 is greater than about ten (10:1). In various embodiments, the diameter of fan 114 may be significantly larger than that of the low pressure compressor 244, and the low pressure turbine 246 may have a pressure ratio that is greater than about 5:1. Low pressure turbine 246 pressure ratio may be measured prior to inlet of low pressure turbine 246 as related to the pressure at the outlet of low pressure turbine 246 prior to an exhaust nozzle. It should be understood, however, that the above parameters are exemplary of various embodiments of a suitable geared architecture engine and that the present disclosure contemplates other gas turbine engines including direct drive turbofans. FIG. 1 and FIG. 2 provide a general understanding of the sections in a gas turbine engine, and is not intended to limit the disclosure. The present disclosure may extend to all types of turbine engines, including turbofan gas turbine engines and turbojet engines, for all types of applications.

Figure 3:
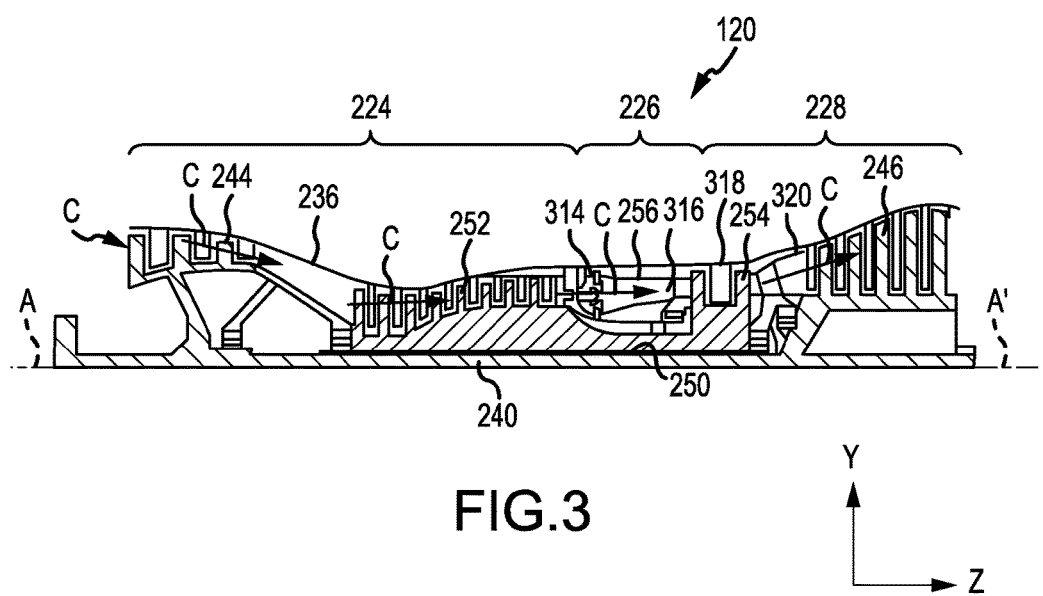
FIG. 3 illustrates the primary-flow gas path in a gas turbine engine through the low pressure compressor, high-pressure compressor, combustor, high-pressure turbine, and low-pressure turbine, in accordance with various embodiments.

With respect to FIG. 3, elements with like element numbering as depicted in FIG. 1 and FIG. 2 are intended to be the same and will not necessarily be repeated for the sake of clarity.

FIG. 3 illustrates the primary flow gas path through core engine 110, in accordance with various embodiments. Core engine 110 may include engine static structure 236, low-pressure compressor 244, high-pressure compressor 252, combustor 256, high-pressure turbine 254, and low-pressure turbine 246. Engine static structure 236 may be referred to as an engine case. Gas may flow into low-pressure compressor 244 along gas path C. Gas flowing through low-pressure compressor 244 along gas path C may be compressed, resulting in an increase in pressure and temperature relative to the pressure and temperature upon entering low-pressure compressor 244. Gas may flow into high-pressure compressor 252 along gas path C. Gas flowing through high-pressure compressor 252 along gas path C may be compressed, resulting in an increase in pressure and temperature relative to the pressure and temperature upon entering high-pressure compressor 252. Uncombusted gas in gas path C leaving high-pressure compressor 252, but having not yet been combusted in combustor 256, may be referred to as T3 gas. T3 gas may have a varying temperature at different engine speeds. The temperature of T3 gas may be about 400° F. (205° C.) when core engine 110 is at idle speeds and may reach about 1,400° F. (760° C.) or higher as core engine 110 accelerates for takeoff, where the term "about" in this context only may refer to +/−200° F. Different engines may have higher temperatures or lower temperatures at each stage. T3 gas may be present at location 314 of core engine 110. T3 gas leaving the high-pressure compressor 252 may then flow into combustor 256 to supply combustor 256 with air for combustion.

In various embodiments, uncombusted T3 gas may be mixed with fuel and burned in combustor 256. Combusted gas in combustor 256 may be referred to as T4 gas. T4 gas may leave combustor 256 and enter high-pressure turbine 254. T4 gas may reach or exceed temperatures of up to 3,500° F. (1,925° C.) or higher. T4 gas may be located at location 316, for example. T4 gas leaving combustor may follow gas path C to drive high-pressure turbine 254.

In various embodiments, combusted gas that has entered, but not exited, high-pressure turbine 254 may be identified as T4.25 gas. T4.25 gas may be significantly cooler than T4 gas exiting combustor 256. For example, T4.25 gas may be at temperatures of about 1,000° F.-2,000° F. (537° C.-1,093° C.), where the term "about" in this context only may refer to +/−500° F. T4.25 gas may be located at location 318, for example. The T4.25 gas then follows out high-pressure turbine 254 and into low-pressure turbine 246 along gas path C.

In various embodiments, combusted gas exiting high-pressure turbine 254 and entering low-pressure turbine 246 may be referred to as T4.5 gas. T4.5 gas may be cooler than T4.25 gas found in the high-pressure compressor or T4 gas exiting the combustor. For example, T4.5 gas may be about 1,500° F. (815° C.) degrees at idle, where the term "about" in this context only may refer to +/−500° F. T4.5 gas may be located at location 320 in gas path C, for example. The T4.5 gas then follows gas path C into low-pressure turbine 246.

Figure 4:
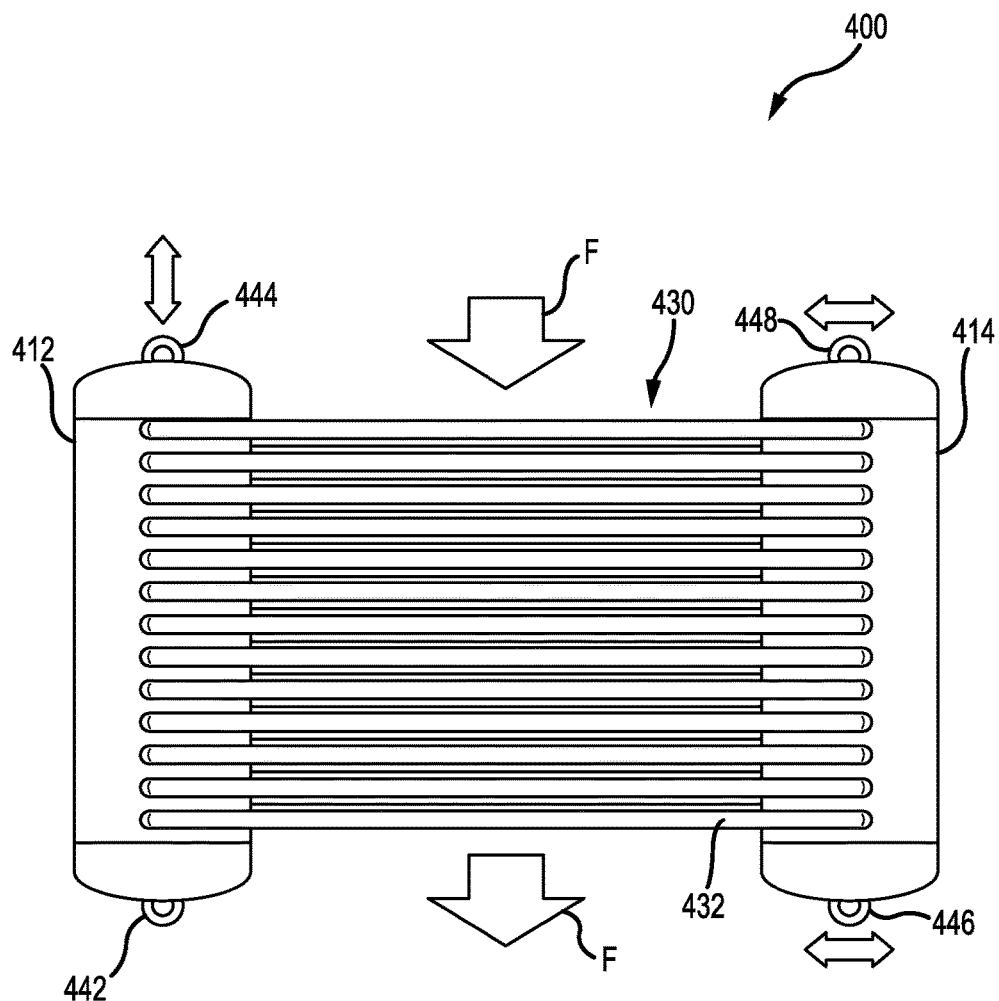
FIG. 4 illustrates a top view of a heat exchanger, in accordance with various embodiments.

With reference to FIG. 4, a top view of a heat exchanger (HEX) 400 is illustrated. An x-y-z axis is provided for ease of illustration. In various embodiments, HEX 400 may comprise an intake manifold 412, an outtake manifold 414, and a plurality of tubes 430. Plurality of tubes 430 may include, for example, tube 432. In various embodiments, intake manifold 412 and outtake manifold 414 may each individually define a cylindrical void or chamber.

In various embodiments, intake manifold 412 may include a first attachment feature 442 and a second attachment feature 444. In various embodiments, first attachment feature 442 may be detachably coupled to intake manifold 412. In various embodiments, first attachment feature 442 may be permanently coupled to intake manifold 412. For example, first attachment feature 442 may be welded, soldered, brazed, or otherwise suitably coupled to intake manifold 412. Second attachment feature 444 may be similar to first attachment feature 442. In various embodiments, outtake manifold 414 may include a third attachment feature 446 and fourth attachment feature 448.

With reference to FIG. 1 and FIG. 4, in various embodiments, first attachment feature 442 may be fixed to gas turbine engine 110 such that first attachment feature 442 may not translate in any direction. Stated another way, first attachment feature may be immovably fixed to gas turbine engine 110. In various embodiments, second attachment feature 444 may be coupled to gas turbine engine 110 such that second attachment feature 444 may be able to translate in the z-direction in response to an increase and/or decrease in temperature. In various embodiments, third attachment feature 446 may be coupled to gas turbine engine 110 such that third attachment feature 446 may be able to translate in the x-direction in response to an increase and/or decrease in temperature. In various embodiments, fourth attachment feature 448 may be coupled to gas turbine engine 110 such that fourth attachment feature 448 may be able to translate in the x-direction in response to an increase and/or decrease in temperature. Accordingly, stress may be mitigated in HEX 400. In various embodiments, at least a portion of HEX 400 may be located in upper bifurcation 144. In various embodiments, at least a portion of HEX 400 may be located in lower bifurcation 142.

In various embodiments, intake manifold 412, outtake manifold 414, and/or plurality of tubes 430 may be made of a high performance nickel-chromium alloy such as an austenitic nickel-chromium-based superalloy (e.g., INCONEL or HAYNES 282), metals, ceramics, or other materials suitable to withstand T3 gas temperatures that may exceed 1,400° F. (760° C.) degrees when core engine 120 is operating at takeoff speeds.

Figure 5:
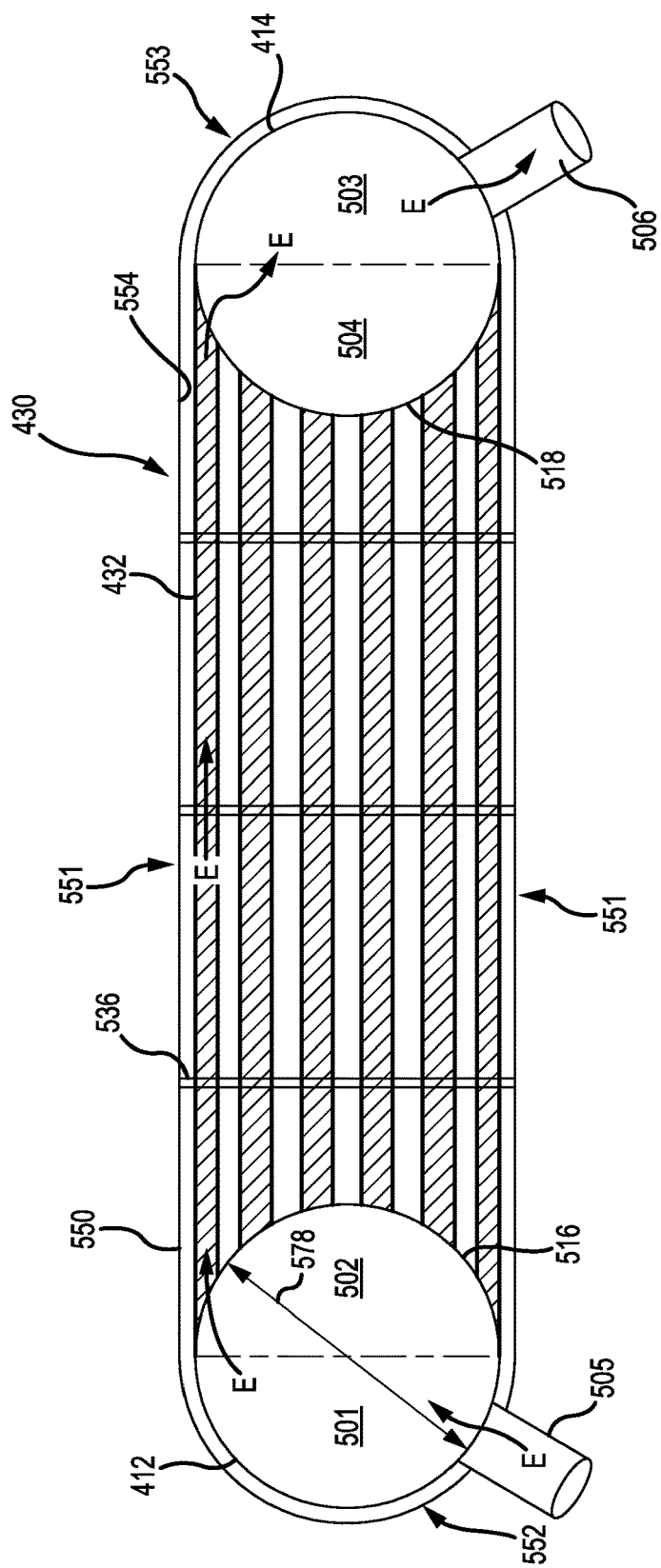
FIG. 5 illustrates a cross-sectional view of a heat exchanger, in accordance with various embodiments.
Figure 6:
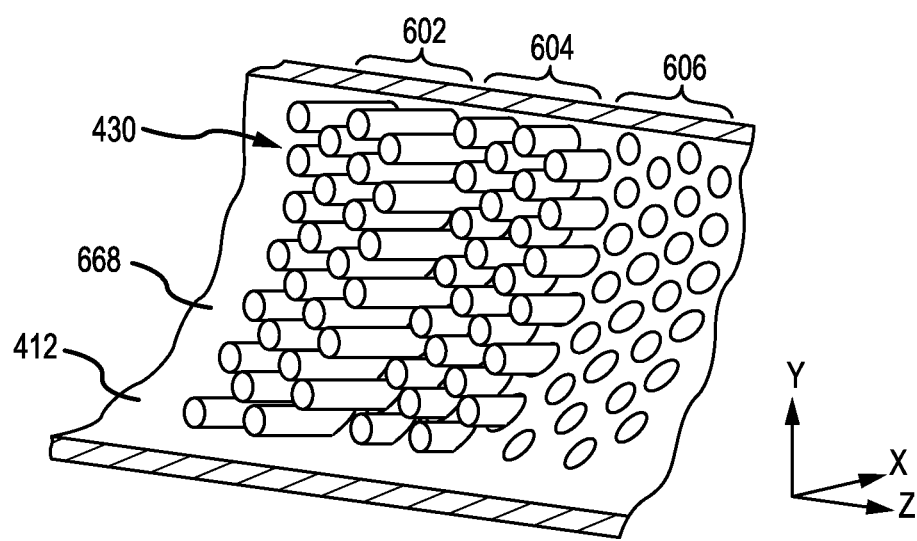
FIG. 6 illustrates a cross-sectional view of part of an intake manifold with tubes installed in a stepped manner, in accordance with various embodiments.
Figure 7:
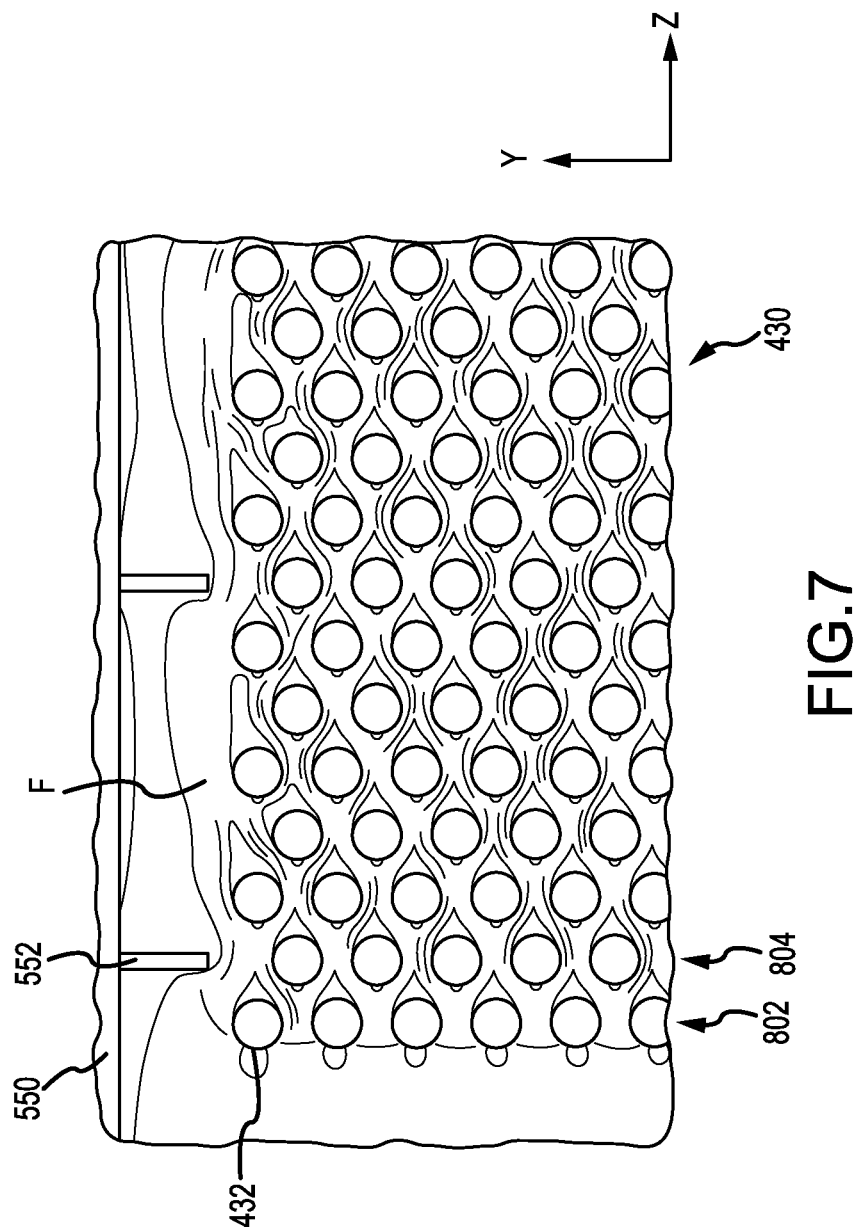
FIG. 7 illustrates a cross-sectional view of a cooling air flow path through heat exchanger tubes installed in an alternating manner, in accordance with various embodiments.

With respect to FIG. 5, FIG. 6, and FIG. 7, elements with like element numbering as depicted in FIG. 4 are intended to be the same and will not necessarily be repeated for the sake of clarity.

With reference now to FIG. 5, HEX 400 may further comprise a shroud 550, in accordance with various embodiments. In various embodiments, shroud 550 may be coupled to intake manifold 412. In various embodiments, shroud 550 may be coupled to outtake manifold 414. Shroud 550 may at least partially encase intake manifold 412, outtake manifold 414, and/or plurality of tubes 430. Intake manifold 412 may comprise a first half 501 and a second half 502. Outtake manifold 414 may comprise a first half 503 and a second half 504. In various embodiments, plurality of tubes 430, including tube 432 for example, may be coupled between second half 502 of intake manifold 412 and second half 504 of outtake manifold 414. Accordingly, intake manifold 412 may be in fluid communication with outtake manifold 414. In various embodiments, intake manifold 412 and outtake manifold 414 may each individually comprise a cylindrical geometry as illustrated in FIG. 5. In various embodiments, intake manifold 412 and outtake manifold 414 may each individually comprise an ovular, elliptical and/or any other geometry. In various embodiments, shroud 550 may comprise a stadium geometry, the stadium geometry comprised of straight portion 551 and rounded portion 553. In various embodiments, shroud 550 may comprise an ovular, elliptical, and/or any other geometry.

In various embodiments, a plurality of baffles, such as baffle 536 for example, may be coupled to plurality of tubes 430. Baffle 536 may comprise a plurality of apertures into which plurality of tubes 430 are inserted. Baffle 536 may add to the stiffness of plurality of tubes 430. In various embodiments, with momentary reference to FIG. 1, the number of baffles installed over plurality of tubes 430 may be determined by the highest operating frequency of gas turbine engine 110. For example, baffles, such as baffle 536 may be installed over plurality of tubes 430 such that the natural frequency of plurality of tubes 430 is higher than the highest operating frequency of gas turbine engine 110.

In various embodiments, baffle 536 may be made of a cobalt alloy (e.g., HAYNES 188) or other materials suitable to create an oxidized layer when exposed to temperatures that may exceed 1,000° F. (538° C.) degrees which may provide a lubricating surface over which plurality of tubes 430 may easily slide across. In various embodiments, baffle 536 may be made of a high performance nickel-chromium alloy such as an austenitic nickel-chromium-based superalloy (e.g., INCONEL or HAYNES 282), metals, ceramics, or other materials suitable to withstand temperatures that may exceed 1,000° F. (538° C.) degrees.

In various embodiments, HEX 400 may comprise hot air flow path E. Hot air flow path E may be defined by intake manifold 412, plurality of tubes 430, and/or outtake manifold 414. Upon entering intake manifold 412, air may follow hot air flow path E, enter the plurality of tubes 430 from intake manifold 412 and then exit the plurality of tubes 430 into outtake manifold 414. For example, air may enter intake manifold 412 via inlet tube 505, then enter tube 432, next it may exit tube 432 into outtake manifold 414, and finally exit outtake manifold 414 via outlet tube 406. Air exiting outtake manifold 414 may be used to cool various portions of a gas turbine engine. In various embodiments, with momentary reference to FIG. 4, while in plurality of tubes 430, air in hot air flow path E may transfer heat to air in cooling air flow path F.

In various embodiments, with reference to FIG. 4 and FIG. 5, inner surface 554 of shroud 550 may at least partially define cooling air flow path F. Outer surface 516 of intake manifold 412 may at least partially define cooling air flow path F. Outer surface 518 of outtake manifold 414 may at least partially define cooling air flow path F. The outer surface of the plurality of tubes 430 may at least partially define cooling air flow path F. In various embodiments, air from bypass flow path B of FIG. 1 may enter cooling air flow path F. In various embodiments, with momentary reference to FIG. 2, air from a low pressure compressor, such as low pressure compressor 244 for example, may enter cooling air flow path F. In various embodiments, using air from low pressure compressor 244 for cooling air flow path F may allow for a decreased size of HEX 400. In various embodiments, air in cooling air flow path F may flow generally in an aft direction (positive z-direction). In various embodiments, heat from air in the plurality of tubes 430 may be transferred to air in cooling air flow path F via the walls of one or more of the plurality of tubes 430. In various embodiments, the transfer of heat may occur in a convective manner. Accordingly, the temperature of air in intake manifold 412 may be greater than the temperature of air in outtake manifold 414. In various embodiments, the flow of air in plurality of tubes 430 may be orthogonal to the flow of air in cooling air flow path F. Thus, the flow of air in tubes 430 and the flow of air in cooling air flow path F may comprise a cross-flow. Accordingly, plurality of tubes 430 may extend in a direction which is orthogonal to cooling air flow path F.

In various embodiments, a pressure gradient may exist between air in hot air flow path E and cooling air flow path F. In various embodiments, air pressure in intake manifold 412 may reach up to 500 pounds per square inch absolute (500 psia) (3,447,378.6 Pascal) or more, while air pressure in cooling air flow path F may generally vary between 14.7 psia (101,352.9 Pascal) and 21 psia (144,789.9 Pascal). In various embodiments, air entering hot air flow path E may reach temperatures of about 1,400° F. (760° C.) or higher. In various embodiments, with reference to FIG. 3, air entering hot air flow path E may comprise T3 gas. In various embodiments, air entering cooling air flow path F may reach temperatures of about 100° F. (38° C.) or higher. In various embodiments, air entering cooling air flow path F may comprise engine bypass air.

In various embodiments, air may enter HEX 400 via inlet tube 505. In various embodiments, HEX 400 may be coupled via inlet tube 505 to a high pressure compressor such as high-pressure compressor 252 of FIG. 2 and FIG. 3. Accordingly, HEX 400 may be in fluid communication via intake manifold 412 with a compressor section 224 of a gas turbine engine. In various embodiments, HEX 400 may be coupled via inlet tube 505 to a compressor section, combustor section, and/or a turbine section of a gas turbine engine. In various embodiments, HEX 400 may be coupled to any portion of a gas turbine engine.

With reference to FIG. 7, a cross-section view of plurality of tubes 430 installed in an alternating manner with a detailed view of cooling air flow path F is illustrated, according to various embodiments. An x-y-z axis is provided for ease of illustration. In various embodiments, plurality of tubes 430 may be installed in an alternating manner. For example, column 804 of plurality of tubes 430 may be offset (in the y-direction) from column 802 such that column 804 is not directly behind (in the z-direction) column 802. Installing tubes 430 in an alternating manner may aide in more efficiently transferring heat from air in plurality of tubes 430 to air in flow path F. Installing tubes 430 in an alternating manner may cause cooling air flow path F to be more turbulent.

In various embodiments, shroud 550 may include flow tab 552. In various embodiments, flow tab 552 may comprise a tab or panel. In various embodiments, flow tab 552 may be configured to contain cooling air flow path F in close proximity to plurality of tubes 430 which may aide in more efficiently transferring heat from air in plurality of tubes 430 to air in flow path F.

FIG. 6 illustrates plurality of tubes 430 in an installed position in a stepped fashion, according to various embodiments. An x-y-z axis is provided for ease of illustration. In various embodiments, with reference to FIG. 5 and FIG. 6, intake manifold 412 may comprise a plurality of apertures. The plurality of apertures may be configured to receive plurality of tubes 430. Plurality of tubes 430 may be inserted from an outer surface 516 of intake manifold 412 to an inner surface 668 of intake manifold 412 in the x-direction. In various embodiments, plurality of tubes 430 may be detachably coupled to intake manifold 412. In various embodiments, plurality of tubes 430 may be permanently coupled to intake manifold 412. For example, tube 432 may be welded, soldered, brazed, or otherwise suitably coupled to intake manifold 412. In various embodiments, plurality of tubes 430 may be flush with inner surface 668 when in an installed position. In various embodiments, plurality of tubes 430 may protrude radially inward from inner surface 668 when in an installed position.

Plurality of tubes 430 may comprise various sections of tubes, each installed at different radial positions. For example, plurality of tubes 430 may comprise various sections of tubes such as section 602, section 604, and section 606, for example. In various embodiments, section 602 may protrude further radially inward than section 604. In various embodiments, section 604 may protrude further radially inward than section 606. In various embodiments, section 606 may be flush with inner surface 668. In various embodiments, plurality of tubes 430 may comprise a gradual or smooth change in radial position, as opposed to a stepped change as described herein. In various embodiments, intake manifold 412 may comprise a pressure gradient along the axial direction (z-direction). Installing plurality of tubes 430 in a stepped fashion may compensate for such pressure gradient resulting in a more uniform flow through plurality of tubes 430. In various embodiments, section 606 may be located adjacent to inlet tube 505 and section 602 may be located opposite of inlet tube 505. Accordingly, plurality of tubes 430 may gradually extend further radially inward from inner surface 668 the further away (in the negative z-direction in FIG. 6) from an inlet source, such as inlet tube 505 for example, they are located. In various embodiments, plurality of tubes 430 may be pre-cut to size before installing into central manifold 410. In various embodiments, plurality of tubes 430 may be installed into central manifold 410 and then cut to length when in the installed position. For example, each tube of plurality of tubes 430 may comprise a similar length, installed into central manifold 410, and then cut to various lengths according to pre-determined specifications. In various embodiments, plurality of tubes 430 may be coupled to outtake manifold 414 in a similar fashion as intake manifold 412. In various embodiments, an end protruding into inlet portion 412 of plurality of tubes 430 may be cut at a diagonal angle which may increase the inlet size of the tube. In various embodiments, one or more orifices may be coupled to an inlet of plurality of tubes 430 in order to meter the flow of air through plurality of tubes 430.

In various embodiments, each tube included in plurality of tubes 430 may comprise a physical flow area which is less than 5% of the flow area of intake manifold 412. With reference to FIG. 5, intake manifold 412 may comprise inner diameter 578, where the flow area of intake manifold 412 is calculated as $\pi$ times one fourth times inner diameter 578 squared, or $(\pi/4)*(\text{inner diameter } 578)^2$. Similarly, the inner diameter of each tube included in plurality of tubes 430 may comprise a flow area. For example, according to various embodiments, tube 432 may comprise a flow area which is less than 5% of the flow area of intake manifold 412. In various embodiments, tube 432 may comprise a flow area in the range from about 1% to about 7% of the flow area of intake manifold 412, wherein the term "about" in this context only means +/−1%. Minimizing the flow area of tube 432 may allow room for more tubes to be included in plurality of tubes 430, thus increasing the overall surface area of plurality of tubes 430. Increasing the overall surface area of plurality of tubes 430 may increase the rate at which heat may be transferred from air in plurality of tubes 430 to air in cooling air flow path F. in various embodiments, the flow area of outtake manifold 414 may be similar to the flow area of intake manifold 412.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A heat exchanger for cooling air in a gas turbine engine comprising:
   an intake manifold in fluid communication with a compressor section and configured to receive air from the compressor section;
   an outtake manifold in fluid communication with the intake manifold via a tube;
   wherein air from the intake manifold travels through the tube to the outtake manifold and from the outtake manifold to a portion of the gas turbine engine; and
   a cooling air flow path defined by at least one of an outer surface of the tube, an outer surface of the intake manifold, and an outer surface of the outtake manifold, wherein the cooling air flow path is orthogonal to said tube,
   wherein air travels through the tube in a direction substantially perpendicular to a central longitudinal axis of the gas turbine engine, and
   the intake manifold includes a first attachment feature configured to be immovably fixed to the gas turbine engine and a second attachment feature configured to be coupled to the gas turbine engine.

2. The heat exchanger of claim 1, further comprising a shroud at least partially encasing said tube.

3. The heat exchanger of claim 1, wherein a flow area of the tube is less than 5% of the flow area of the intake manifold.

4. The heat exchanger of claim 1, wherein the cooling air flow path receives air from at least one of a bypass flow path and a low pressure compressor of the gas turbine engine.

5. The heat exchanger of claim 1, wherein the tube is coupled to a second half of the intake manifold and coupled to a second half of the outtake manifold.

6. The heat exchanger of claim 1, wherein the outtake manifold includes a third attachment feature configured to be coupled to the gas turbine engine and a fourth attachment feature configured to be coupled to the gas turbine engine.

7. The heat exchanger of claim 1, wherein at least one of the intake manifold and the outtake manifold defines a cylindrical void.

8. The heat exchanger of claim 1, wherein the intake manifold is configured to receive air from a high pressure compressor section of the gas turbine engine.

9. A gas turbine engine comprising:
   a compressor section; and
   an air-to-air heat exchanger comprising:
      an intake manifold in fluid communication with the compressor section and configured to receive air from the compressor section;
      an outtake manifold in fluid communication with the intake manifold via a tube;
      wherein air from the intake manifold travels through the tube to the outtake manifold and from the outtake manifold to a portion of the gas turbine engine; and
      a cooling air flow path defined by at least one of an outer surface of the tube, an outer surface of the intake manifold, and an outer surface of the outtake manifold, wherein the cooling air flow path is orthogonal to said tube,
      air travels through the tube in a direction substantially perpendicular to a central longitudinal axis of the gas turbine engine, and
      the intake manifold includes a first attachment feature configured to be immovably fixed to the gas turbine engine and a second attachment feature configured to be coupled to the gas turbine engine.

10. The gas turbine engine of claim 9, further comprising a shroud at least partially encasing said tube.

11. The gas turbine engine of claim 9, wherein a flow area of the tube is less than 5% of the flow area of the intake manifold.

12. The gas turbine engine of claim 9, wherein the cooling air flow path receives air from a bypass flow path of the gas turbine engine.

13. The gas turbine engine of claim 9, wherein the tube is coupled to a second half of the intake manifold and coupled to a second half of the outtake manifold.

14. The gas turbine engine of claim 9, wherein the outtake manifold includes a third attachment feature configured to be coupled to the gas turbine engine and a fourth attachment feature configured to be coupled to the gas turbine engine.

15. The gas turbine engine of claim 9, wherein at least one of the intake manifold and the outtake manifold defines a cylindrical void.

16. The gas turbine engine of claim 9, wherein the intake manifold is configured to receive air from the compressor section of the gas turbine engine.

17. A heat exchanger for a gas turbine engine comprising:
an intake manifold in fluid communication with a compressor section and configured to receive air from the compressor section;
an outtake manifold in fluid communication with the intake manifold;
a tube extending between the intake manifold and the outtake manifold, wherein the intake manifold is in fluid communication with the outtake manifold via the tube;
a first attachment feature coupled to the intake manifold; and
a second attachment feature coupled to the intake manifold, wherein the first attachment feature and the second attachment feature are coupled to opposite ends of the intake manifold;
wherein air from the intake manifold travels through the tube to the outtake manifold; and
a cooling air flow path defined by at least one of an outer surface of the tube, an outer surface of the intake manifold, and an outer surface of the outtake manifold, wherein the cooling air flow path is orthogonal to said tube.

* * * * *